United States Patent [19]
kido et al.

[11] Patent Number: 6,051,307
[45] Date of Patent: Apr. 18, 2000

[54] THERMOPLASTIC MOLDED ARTICLE CONTAINING CARBON FIBER

[75] Inventors: Toshirou kido; Shinji Hasegawa, both of Yokohama, Japan

[73] Assignee: Asahi Kasei Kogyo Kabushiki Kaisha, Osaka, Japan

[21] Appl. No.: 09/241,445

[22] Filed: Feb. 2, 1999

[51] Int. Cl.⁷ .................................. B28B 3/20; C08J 5/06; C08K 7/06
[52] U.S. Cl. .................. 428/297.4; 264/105; 264/176.1; 428/299.1
[58] Field of Search .............................. 428/297.4, 299.1; 264/105, 176.1

[56] References Cited

U.S. PATENT DOCUMENTS

| 4,339,490 | 7/1982 | Yoshioka et al. | 428/213 |
| 5,538,784 | 7/1996 | Subramanian | 428/283 |

FOREIGN PATENT DOCUMENTS

| 60-202154 | 10/1985 | Japan . |
| 6097695 | 4/1994 | Japan . |

*Primary Examiner*—Blaine Copenheaver
*Attorney, Agent, or Firm*—Birch, Stewart, Kolasch & Birch, LLP

[57] ABSTRACT

A molded article comprising:
(1) 70 to 99.5% by weight of a thermoplastic resin, and
(2) 0.5 to 30% by weight of carbon fibers;
wherein the carbon fiber comprises,
(a) carbon fibers having a length of more than 1.5 mm being contained in an amount of 0.1 to 4.7% by weight,
(b) carbon fibers having a length of 0.5 to 1.5 mm being contained in an amount of 0.2 to 10.7% by weight, and
(c) carbon fibers having a length of less than 0.5 mm being contained in an amount of 0.2 to 14.6% by weight, wherein the weight % is based on the total amount of the thermoplastic resin and the carbon fibers.

15 Claims, No Drawings

THERMOPLASTIC MOLDED ARTICLE CONTAINING CARBON FIBER

BACKGROUND OF THE INVENTION

1. Field of the Invention

The present invention relates to a molded article comprising a thermoplastic resin containing carbon fibers. More particularly, the present invention relates to a molded article comprising a thermoplastic resin and carbon fibers, which is excellent in appearance, mechanical strength and electric properties.

2. Description of Related Art

Due to the rapid spread of electrical appliances, there have been increasing demands for shielding electromagnetic radiation by imparting conductivity to the housings of personal computers, cellular phones, parts of automobile and the like, for the purpose of preventing the ill effects associated with the electromagnetic fields caused by the electrical appliances. With regard to integrated circuits (IC), an IC tray, which contains an IC, are conventionally prepared from thermoplastic resins having good moldability. In order to protect the IC from the harmful effects of static electricity, it is necessary to make the IC trays of a conductive thermoplastic resin which imparts an antistatic function thereto. Furthermore, the metal parts of reels for magnetic tapes and paper feed rollers for copiers are just now being replaced by moldable thermoplastic resins. Accordingly, there have been increasing demands for imparting conductivity to the cassette reels and paper feed rollers to prevent static electricity.

Attempts to impart conductivity to thermoplastic articles include using conductive polymer resins. However, conductive polymer resins are very expensive and are not suitable for practical use. Accordingly, conventional thermoplastic resins available on the market have been employed to impart conductivity to molded articles. Two typical methods have been used to impart conductivity to the common thermoplastic article. The first comprises forming a conductive coat on the surface of a thermoplastic molded article by plating or vapor deposition. The second comprises mixing conductive materials such as a metal powder, metal fiber, carbon black or a carbon fiber with the thermoplastic resin and molding the composite resin into an article.

Among the above two methods, the first is inferior in productivity since it comprises two steps, i.e., a molding step and a conductive coat forming step. On the other hand, the second is more productive since it comprises just one step, i.e., a molding step.

Regarding the method of blending conductive materials with a thermoplastic resin, the conductive materials are generally in the form of powder or a fiber. When the conductive materials and resin are blended at the same ratio, an article containing fibrous materials shows more excellent conductivity than one containing powdery materials. In view of the fact that conductivity across the entire length of the article requires a continuous conductive medium between the electrical contacts, the electric charge must be able to traverse the space between the individual conductive fibers/particles dispersed in the thermoplastic resin, therefore, the materials in the form of a fiber are more likely to be in "electrical contact" with each other than those in the form of powder. Therefore, it naturally follows that longer fibers provide better conductivity than shorter fibers. As explained above, carbon and metal fibers are known to effect good conductivity. Of these, a carbon fiber having excellent affinity to the resin, especially a long carbon fiber, is most preferable since it effects a high conductive function.

Conventional methods for imparting conductivity to molded articles using long carbon fiber are classified into two types.

The first method comprises the steps of chopping a roving of the carbon fiber, melt mixing the chopped carbon fiber with a thermoplastic resin using an extruder to obtain pellets containing the carbon fibers, and then molding the pellets into an article. However, the obtained article usually does not have the requisite properties, especially good electromagnetic interference shielding, because a uniform distribution and adequate length of carbon fiber in the article cannot be obtained.

In order to avoid the defects associated with the above method, a second method has been proposed. This second method comprises the steps of coating a roving of the carbon fiber with a melted resin using either an extruder or a bath while aligning the roving through tension, cutting the roving coated with the resin into pellets, and molding the resultant pellets to obtain an article. For example, according to this method, a molded article has been proposed in which the carbon fiber retains a relatively long length (Japanese Patent Publication Examined No. 5-26828). Particularly, the molded article comprises a thermoplastic resin and 5 to 35 parts by weight, based on 100 parts of the resin, of carbon fiber having a length of 1.5 to 15 mm (the 5 to 35 parts of the carbon fiber correspond to 4.8 to 26% by weight based on the total amount of the thermoplastic resin and the carbon fiber). Upon comparison of the article obtained according to the first method, the strength and electromagnetic interference (EMI) shield of this article are improved. However, these improvements are not sufficient enough to satisfy the current demand for even higher strength and shielding properties. In addition, these articles containing carbon fibers which are prepared with either longer or in a higher concentration, in an attempt to achieve excellent strength and EMI shielding, have such a poor appearance to apply to practical uses.

SUMMARY OF THE INVENTION

The present invention provides a molded article comprising:

(1) 70 to 99.5% by weight of a thermoplastic resin, and (2) 0.5 to 30% by weight of carbon fibers;

wherein the carbon fiber comprises, (a) carbon fibers having a length of more than 1.5 mm being contained in an amount of 0.1 to 4.7% by weight, (b) carbon fibers having a length of 0.5 to 1.5 mm being contained in an amount of 0.2 to 10.7% by weight, and (c) carbon fibers having a length of less than 0.5 mm being contained in an amount of 0.2 to 14.6% by weight, wherein the weight % is based on the total amount of the thermoplastic resin and the carbon fibers.

A primary object of the present invention is to provide an article excellent in electric properties, appearance and mechanical strength.

DETAILED DESCRIPTION OF THE INVENTION

The present inventors have made extensive and intensive studies to solve the above-mentioned defects of the conventional thermoplastic molded articles containing carbon fibers, and have found that a thermoplastic molded article having excellent mechanical strength, electric properties and appearance can be obtained by adjusting the amount of long carbon fibers dispersed thereinto.

The thermoplastic resin of the present invention can be arbitrarily selected from the thermoplastic resins which have been conventionally employed as molding materials. Such thermoplastic resins include a styrenic resin, a polyphenylene ether resin, a polyolefin resin, a polyvinyl chloride resin, a polyamide resin, a polyester resin, a polyacetal resin, a polycarbonate resin, an acrylic resin and the like.

The styrenic resins usable in the present invention include homopolymers such as styrene and a-methylstyrene and copolymers comprising the homopolymers and optionally other unsaturated monomers which are copolymerizable therewith. Specifically, the present invention includes, but is not limited to, general purpose polystyrene (GPPS), high impact polystyrene (HIPS), heat resistant polystyrene such as a homopolymer or copolymer comprising a-methylstyrene, an ABS resin (an acrylonitrile/butadiene/styrene copolymer), an acrylonitrile/butadiene/styrene/α-methylstyrene copolymer (α-methylstyrene type heat resistant ABS), an acrylonitrile/butadiene/styrene/phenyl maleimide copolymer (phenyl maleimide type heat resistant ABS), an acrylonitrile/styrene copolymer (AS), an acrylonitrile/chloropolystyrene/styrene copolymer (ACS), an acrylonitrile/ethylene-propylene-rubber/styrene copolymer (AES), an acrylate-rubber/acrylonitrile/styrene copolymer (AAS), syndiotactic polystyrene (SPS) and the like. Further, a mixture of the above styrenic resins may be used.

The polyphenylene ether (PPE) usable in the present invention include homopolymers such as poly(2,6-dimethyl-1,4-phenylene)ether and poly(2-methyl-6-ethyl-1,4-phenylene)ether and copolymers thereof. Also, PPE may be modified with styrenic resins for use.

The polyolefin resins included in the present invention are homopolymers comprising α-olefin such as ethylene, propylene, 1-butene, 3-methyl-1-butene, 3-methyl-1-pentene and 4-methyl-1-pentene and copolymers comprising these monomers and optionally other unsaturated monomers copolymerizable therewith. Examples include polyethylenes such as high density polyethylene, medium density polyethylene, low density polyethylene, linear low density polyethylene, ultra-high molecular weight polyethylene, an ethylene/vinyl acetate copolymer, an ethylene/ethyl acrylate copolymer and an ethylene/α-olefin copolymer, obtainable using a metallocene catalyst, like an ethylene/octene-1copolymer; polypropylenes such as atactic polypropylene, syndiotactic polypropylene, isotactic polypropylene, a propylene/ethylene block copolymer and a propylene/ethylene random copolymer; polymethylene 1-pentene; and the like.

The polyvinyl chloride resins included in the present invention are a vinyl chloride homopolymer and a copolymer comprising vinyl chloride and unsaturated monomers copolymerizable therewith. Examples include a vinyl chloride/acrylate copolymer, a vinyl chloride/methacrylate copolymer, a vinyl chloride/ethylene copolymer, a vinyl chloride/propylene copolymer, a vinyl chloride/vinyl acetate copolymer, a vinyl chloride/vinylidene chloride copolymer and the like. The polyvinyl chloride resins may be chlorinated to increase a chloride content for use.

The polyamide resins included in the present invention are nylon-6, nylon-6,6, nylon-6,10, nylon-6,12, nylon-12 and the like. Nylon-6 is obtained by ring opening polymerization of caprolactam. Nylon-6,6, nylon-6,10, nylon-6,12 and the like are obtained by polycondensation of aliphatic diamine and aliphatic dicarboxylic acid, and optionally copolycondensation of aromatic diamine and aromatic dicarboxylic acid.

The polyester resins included in the present invention can be obtained by polycondensation of aromatic dicarboxylic acid and alkylene glycol such as ethylene glycol, propylene glycol and butylene glycol. Specifically, there are enumerated polyethylene terephthalate (PET), polypropylene terephthalate (PPT), polybutylene terephthalate (PBT) and the like.

The acetal resins usable in the present invention include a polyoximethylene homopolymer, a formaldehyde/ethylene oxide copolymer obtained from trioxane and ethylene oxide, and the like.

The polycarbonate resins usable in the present invention can be selected from homopolycarbonates and copolycarbonates. Specifically, there are enumerated 4,4'-dihydroxydiaryl alkane-type, bisphenol A-type, modified bisphenol A-type and flame retardant bisphenol A-type polycarbonates.

The acrylic resins usable in the present invention include homopolymers of methacrylate and acrylate, and copolymers comprising the homopolymers and optionally other unsaturated monomers copolymerizable therewith. The methacrylate and acrylate monomers include methyl methacrylate, methyl acrylate, ethyl methacrylate, ethyl acrylate, n-propyl, isopropyl, butyl ester, and the like. A methacrylic resin (PMMA) is enumerated as a typical acrylic resin usable in the present invention.

The above-mentioned thermoplastic resins may be used individually or in combination. Further, these thermoplastic resins can incorporate with a heat stabilizer, a ultraviolet absorber, a light stabilizer, an antioxidant, a plasticizer, a mold release agent, a lubricant, a flame retardant, a colorant such as a dye and a pigment, and the like. For the purpose of achieving higher conductivity, other conductive materials may be also employed.

The carbon fiber employed in the present invention can be prepared using various raw materials such as polyacrylonitrile and pitch. Further, a carbon fiber, of which surface is coated with a conductive metal, can be employed. The conductive metal coat can be formed by plating or immersion to improve the conductivity of resultant molded articles. The diameter of the carbon fiber is preferably 2 to 10 $\mu$m. If the diameter is less than 2 $\mu$m, the carbon fibers are unlikely to be dispersed uniformly in the article. If it is more than 10 $\mu$m, it is difficult to control the length of the carbon fibers contained in the molded article since the fibers are likely to break into small pieces or form powder-like materials during the molding process.

In the present invention, the carbon fiber content of the molded article is 0.5 to 30% by weight, preferably 0.5 to 25% by weight, more preferably 0.5 to 20% by weight, based on the total amount of the thermoplastic resin and the carbon fiber. When the content is less than 0.5% by weight, it is difficult to impart conductivity to the molded article. When it is more than 30% by weight, the melt flow rate is likely to decrease and the appearance of the molded article becomes poor. Further, it is necessary that the content of the carbon fiber having a length of more than 1.5 mm is 0.1 to 4.7% by weight based on the total amount of the thermoplastic resin and the carbon fiber. When the content of the 1.5 mm long carbon fiber is less than 0.1% by weight, the conductivity of the resultant molded article becomes low. When it is more than 4.7% by weight, the resultant molded article has not only a poor appearance which reduces its commercial value, but also the conductivity thereof is decreased even though the content of the carbon fiber in the resin is the same. In other words, if the carbon fibers are too long, shear stress tends to be reduced so that the carbon fibers become localized in the thermoplastic resin, i.e., they are not dispersed uniformly. As a result, the appearance of the molded article is deteriorated due to exposed carbon fibers and the agglomeration of the carbon fibers gives the surface a rough texture, and the conductivity thereof become low despite of the same carbon fiber content, since the localization of the carbon fibers causes too large a space for the charge to cross.

As described above, the molded article of the present invention comprises: (a) the carbon fiber having a length of more than 1.5 mm, (b) the carbon fiber having a length of 0.5 to 1.5 mm and (c) the carbon fiber having a length of less than 0.5 mm are 0.1 to 4.7% by weight, 0.2 to 10.7% by weight and 0.2 to 14.6% by weight, respectively wherein the weight % is based on the total amount of the thermoplastic resin and the carbon fibers. The weight ratio of (a)/(b)/(c) is preferably 1/0.5–2.5/0.5–0.3, more preferably 1/1.0–2.5/0.8–3.0. The remarkable feature of the present invention is that when the carbon fibers are dispersed in the manner as specified above, it is possible to produce a molded article with the excellent balance in mechanical strength, appearance and conductivity. This may be because the longer and shorter fibers become intimately entangled.

In the present invention, either naked or coated carbon fibers can be used. It is preferable to use the carbon fiber coated with a resin compatible with the matrix resin. When using a carbon fiber roving, it is preferred that the surface of either each filament of the roving, a plurality of filaments or the whole roving is coated with a resin compatible with the matrix resin. From the viewpoint of dispersing the carbon fiber more preferably and uniformly in the matrix resin, it is preferable that the surface of each filament is coated. Any resin having an affinity for the matrix resin can be used.

The resin compatible with the matrix resin include thermoset resins or thermoplastic resins. The thermoset resins may be an epoxy type, an urethane type or the like. The thermoplastic resins may be a polyolefin resin or the like. From the viewpoint of the industrial manufacturing, it is preferable to use resins suitable for coating the carbon fiber. For thermoset resins, the carbon fiber is coated with a monomer of the resins and then is cured by a coupling agent. For thermoplastic resins, a resin is applied to the surface of the carbon fiber according to a melt-extrusion method or a method comprising coating the carbon fiber with a solution, aqueous slurry or emulsion of the resin followed by a drying step. The melt-extrusion method and the method using an emulsion of the resin are more preferable from the industrial and environmental point of view.

Specifically, the above-mentioned emulsion includes styrene type emulsion such as styrene/butadiene copolymer resin emulsion (SB latex), acrylonitrile/styrene copolymer resin emulsion and styrene/acrylic copolymer emulsion; acrylic emulsion such as methyl methacrylate-2-ethyl hexyl acrylate/butyl acrylate copolymer resin emulsion; ethylene type emulsion such as ethylene/vinyl acetate copolymer resin emulsion and methylene/methacrylic copolymer resin emulsion; vinyl acetate type emulsion; urethane type emulsion; and the like.

It is preferable to select an emulsion capable of being applied to the carbon fiber according to the types of thermoplastic matrix resins. In other words, the emulsion which is sufficiently compatible with the thermoplastic matrix resin is preferred. A matrix resin which is a polystyrenic resin or modified PPE, styrene/butadiene copolymer resin emulsion is preferable. Of the following matrix resins AS, ABS, PMMA, PET and PC resin, an acrylonitrile/styrene copolymer resin emulsion is preferable. When the matrix resin is a polyolefin type resin or POM, ethylene/vinyl acetate copolymer resin emulsion is preferable. When the matrix resin is an polyamide resin, a urethane type emulsion is preferable. As emulsion, commercially available ones having a solid content of 30 to 70% can be used as purchased or after dilution.

The carbon fiber can be coated with the resin, for instance, by spraying a solution or emulsion of the resin to a carbon fiber roving or by immersing a carbon fiber roving into a solution or emulsion of the resin.

The coat can consist of a single layer or multiple layers and can be formed by carrying out the above-mentioned method once or several times. In the case of a multi-layered coat, each of the layers may be made of the same or different resin. The carbon fiber coated with a thermoset resin such as epoxy or urethane can be further coated with a thermoplastic emulsion resin.

From the viewpoint of dispersibility of the carbon fiber in the matrix resin and a cost of raw materials, the amount of the resin applied to the carbon fiber is preferably 0.5 to 50% by weight, more preferably 5 to 20% by weight, in terms of a solid content. When the amount of the resin is less than 0.5% by weight, it is difficult to achieve good dispersibility. When it is more than 50% by weight, it is difficult to be commercially competitive.

The molded article can be prepared by the following two methods.

(1) One method employs pellets containing a matrix resin and a carbon fiber for molding the article. This method comprises the steps of coating the carbon fiber roving with the matrix resin, cutting the coated roving into pellets, and molding the resultant pellets into an article, in which method, it is more preferable that the carbon fiber roving is coated with a resin compatible with the matrix resin and optionally dried before coated with the matrix resin, and is further coated with the matrix resin preferably according to extrusion coating followed by cutting to prepare pellets. Upon molding the resultant pellets, they can be molded on their own or with additional pellets made of a matrix resin without containing carbon fibers. The resin without containing carbon fibers may be the same as or different from the thermoplastic resin applied to the carbon fiber. If different, the resin without the carbon fibers is preferably compatible with the resin applied to the carbon fiber, and is not easy to peel off.

(2) The other method employs carbon fiber, which is not coated with the matrix resin, and a matrix resin for molding. This method comprises the steps of cutting or chopping the carbon fiber roving, mixing the cut or chopped carbon fiber with the matrix resin, and molding the resultant mixture into an article. It is preferable that the carbon fiber roving is preliminarily coated with a resin compatible with the matrix resin and optionally dried before being cut or chopped. The matrix resin to be mixed with the cut or chopped carbon fiber may be a single resin or a combination of resins.

The length of the carbon fiber before the molding step is one of the factors which determine the length or distribution of carbon fibers in the molded article. In other words, the length of pellets comprising the thermoplastic matrix resin and the carbon fiber or that of the cut or chopped carbon fiber greatly influences the length or distribution of carbon fibers in the molded article. The length of the carbon fiber before molded is preferably 2 to 10 mm, more preferably 3 to 7 mm. When it is less than 2 mm, the carbon fiber tends to break into such small pieces that the conductivity of the resultant article may be lowered. When it is more than 10 mm, the carbon fiber tends to cause bridging at the hopper of the molding machine so that productivity may be reduced.

The molded article of the present invention may be prepared according to extrusion molding, injection molding, blow molding and the like.

There are various factors for controlling the length of the carbon fiber in the molded article. Among them, the length of the carbon fiber before the molding step and the shear stress during molding are the main factors. Accordingly, the length of the carbon fiber in the molded article can be adjusted by controlling the length of either the pellets or chopped carbon fiber; the melt viscosity of the matrix resin; and the molding conditions such as molding temperature, back pressure, screw structure, screw revolution speed per minute (rpm), injection speed, nozzle shape, gate shape and gate size.

Since the molded article made of the thermoplastic resin containing the carbon fibers proposed in the present invention are excellent in conductivity and appearance, it may be used as follows.

(1) An Article With an Electromagnetic Interference Shield (EMI Shield) Function The conductive article of the present invention can be employed for housings or internal parts for electronic and electrical appliances such as personal computers, word processors, compact disc players, portable stereos, cellular phones, transceivers and cameras, and as internal parts for slot machines, and the like. In this case, the carbon fiber content in the article is preferably 2 to 30% by weight, more preferably 5 to 25% by weight, particularly preferably 10 to 20% by weight, based on the total amount of the thermoplastic resin and the carbon fiber. The content of the carbon fiber having a length of more than 1.5 mm in the article is preferably 0.1 to 4.7% by weight, more preferably 0.5 to 4.7% by weight, based on the total amount of the thermoplastic resin and the carbon fiber. The volume resistivity of the article is preferably $10^{-4}$ to $10^3$ $\Omega \cdot cm$, more preferably $10^{-4}$ to $10$ $\Omega \cdot cm$, most preferably $10^{-4}$ to $1$ $\Omega \cdot cm$.

(2) Resin Resistor

The conductive article of the present invention can be employed for electric resin resistors such as a variable resistor and a resistor for an electric circuit, particularly for resistors having high resistivity. In this case, the carbon fiber content in the article is preferably 0.5 to 5% by weight, more preferably 1.0 to 5% by weight, based on the total amount of the thermoplastic resin and the carbon fiber. The content of the carbon fiber having a length of more than 1.5 mm in the article is preferably 0.1 to 4.7% by weight, more preferably 0.5 to 2.5% by weight, based on the total amount of the thermoplastic resin and the carbon fiber. The volume resistivity of the article is preferably $10^2$ to $10^{13}$ $\Omega \cdot cm$.

(3) Antistatic Sliding Part

The conductive article of the present invention can be used for sliding elements which are in contact with other elements during movement, for instance, reels of magnetic tapes, paper feed rollers for copier, bearings of various rotating elements and the like, because of its excellent abrasion resistance. In this case, the carbon fiber content in the article is preferably 0.5 to 10% by weight, more preferably 1.0 to 10% by weight, based on the total amount of the thermoplastic resin and the carbon fiber. The content of the carbon fiber having a length of more than 1.5 mm in the article is preferably 0.1 to 4.7% by weight, more preferably 0.5 to 4.0% by weight, based on the total amount of the thermoplastic resin and the carbon fiber. The volume resistivity of the article is preferably $10^0$ to $10^{12}$ $\Omega \cdot cm$.

(4) IC Tray

The conductive article of the present invention can be used for an IC tray for IC transportation. The IC tray must be antistatic in order to protect an IC from static electricity. In this case, the carbon fiber content in the article is preferably 0.5 to 5.0% by weight, more preferably 1.0 to 5.0% by weight, based on the total amount of the thermoplastic resin and the carbon fiber. The content of the carbon fiber having a length of more than 1.5 mm in the article is preferably 0.1 to 4.7% by weight, more preferably 0.5 to 2.5% by weight, based on the total amount of the thermoplastic resin and the carbon fiber. The surface resistivity of the article is preferably $10^2$ to $10^{10}$ $\Omega$.

For the purpose of improving conductivity of the molded article of the present invention, the article can be plated. Further, for the purpose of improving surface gloss and coloring, the article can be subjected to electrostatic coating.

DESCRIPTION OF PREFERRED EMBODIMENT

Hereinbelow, the present invention is described in more detail with reference to the following Examples and Comparative Examples, but they should not be construed as limiting the scope of the present invention.

The apparatus, material, method for measurement and evaluation employed in Examples and Comparative Examples are as follows:

1. Pelletizer

Tumbler: Twin cone type with 20 to 40 rpm manufactured by Nichiei Denki K.K., Japan Single-screw extruder: VS-30 manufactured by Tanabe Plastics K.K., Japan Twin-screw extruder: TEM-35B manufactured by Toshiba Machine Co., Ltd., Japan 2. Injection Molding Machine Injection Molding Machine-1: IS55EPN manufactured by Toshiba Machine Co., Ltd., Japan Injection Molding Machine-2: IP1050 manufactured by Komatsu Ltd., Japan 3. Thermoplastic Resin HIPS: Styron® EXG11 manufactured by Asahi Chemical Industry Co., Ltd., Japan PMMA: Delpet® 80 N manufactured by Asahi Chemical Industry Co., Ltd., Japan AS: Stylac® AS783 manufactured by Asahi Chemical Industry Co., Ltd., Japan ABS-1: Stylac® ABS100 manufactured by Asahi Chemical Industry Co., Ltd., Japan ABS-2: Stylac® ID32F manufactured by Asahi Chemical Industry Co., Ltd., Japan PPE-1: Xyron® 100Z manufactured by Asahi Chemical Industry Co., Ltd., Japan PPE-2: Xyron® X9830 manufactured by Asahi Chemical Industry Co., Ltd., Japan PE-1: Suntec® HD.J340 manufactured by Asahi Chemical Industry Co., Ltd., Japan PE-2: Suntec® HD.J751 manufactured by Asahi Chemical Industry Co., Ltd., Japan PP: J-ALLOMER® manufactured by Japan Polyolefins Co., Ltd., Japan POM: Tenac® C4510 manufactured by Asahi Chemical Industry Co., Ltd., Japan PA: Leona® 1300S manufactured by Asahi Chemical Industry Co., Ltd., Japan 4. Resin Compatible with Matrix Resin (Sizing Agent for Carbon Fiber)

SB emulsion: Styrene/butadiene copolymer resin latex (solid content: 40% by weight)

AS Emulsion: Acrylonitrile/styrene copolymer resin latex (AN: 25%; solid content: 50% by weight)

EVA emulsion: Ethylene/vinyl acetate copolymer resin latex (vinyl acetate: 20%; solid content: 50% by weight)

Urethane emulsion: Urethane resin latex (solid content: 40% by weight)

5. Conductive Material (Carbon Fiber)

Carbon fiber roving (CF-R): HTA-12K manufactured by Toho Rayon K.K., Japan

Chopped carbon fiber (C-CF): A6000 manufactured by Mitsubishi Rayon Co., Ltd., Japan 6. Measurement and Evaluation Methods (a) Gloss A thermoplastic resin, if necessary, was formed into dried pellets, and injection molded in the general molding cycle using Injection Molding Machine-1 wherein a cylinder temperature was adjusted so as to be adequate for the thermoplastic resin to be employed and a mold temperature be 60° C. to obtain a plate with a mirror surface (W 50 mm×L 90 mm×T 2.5 mm). The gloss of the resultant plate was measured using a portable glossmeter Model HG-268 manufactured by Suga Test Instruments Co., Ltd., Japan, at a measuring angle of 60°.

(b) Volume Resistivity (Ω·cm)

Both end surfaces of the above-obtained plates, which were located at the ends of the longitudinal direction, i.e., the resin flow direction upon molding, was fully coated with a silver paste and dried to measure resistance ($R_L$) using an ohmmeter. Then, a volume resistivity $R_1$ (Ω·cm) was calculated from the formula $R_1=R_L \times A_L/L$ (wherein $A_L$: cross-sectional area; L: length).

(c-1) Surface Resistivity (in the case of $10^7 \Omega$ or less)

Both edges on the surface of the above-obtained plates, which were located at the ends of the longitudinal direction, i.e., the resin flow direction upon molding, was coated, in parallel, with a silver paste in a width of 2 mm and dried to measure a resistance ($R_S$) using a tester. Then, a surface resistivity $R_2$ (Ω) was calculated from the formula $R_2=R_s \times Y/Z_2$ (wherein Y: length of the silver paste lines; $Z_2$: distance between the two silver paste lines).

(c-2) Surface Resistivity (in the case of more than $10^7 \Omega$)

The above-obtained plate was charged for 45 seconds at 500 V using a conductivity measuring device, SME-8310 manufactured by Toa Dempa Kogyo K.K., Japan, followed by discharge. After 15 second discharge, a resistivity (Ω) was measured.

(d) Carbon Fiber Dispersibility in Article

A plate was prepared according to the same process as in the above (a) except that $TiO_2$ was added to the thermoplastic resin in an amount of 1 part per 100 parts of the resin to make the plate gray for the purpose of easy evaluation. The agglomeration of carbon fibers in the article was evaluated by visual inspection. No agglomeration was defined as ○. Slight agglomeration was defined as Δ. A high portion of agglomeration was defined as ×.

(e) Appearance of Article

The appearance of the plate used for gloss measurement was evaluated by visual inspection. One without problem in the appearance and with marketability was defined as ○. One with partially poor appearance due to exposure of the carbon fibers and rough surface caused by agglomeration of the carbon fibers was defined as Δ. One with considerably poor appearance due to exposure of the carbon fibers and rough surface caused by agglomeration of the carbon fiber was defined as ×.

(f) Carbon Fiber Length in Article

Using Injection Molding Machine-1, an article was obtained according to the same process as in the above (a).

A specimen was cut out from almost the center of the plate. The part where the specimen was cut out was along with the line between the gate and end part and almost at the center of the mid-80% of the distance therebetween. The specimen was calcined in the air at 500° to 600° C. for 30 minutes and inspected with a light microscope to measure the length and distribution of the carbon fibers in the molded article.

(g) Bending Strength and Flexural Modulus

The bending strength and flexural modulus were measured according to ASTM-D 790.

(h) Electromagnetic Interference Shield (EMI Shield)

A thermoplastic resin, if necessary, was formed into dried pellets, and injection molded in the general molding cycle using Injection Molding Machine-2 wherein a cylinder temperature was adjusted so as to be adequate for the thermoplastic resin to form a plate (W 100 mm×L 100 mm×T 2 mm). Using a network analyzer MS4661A manufactured by Anritsu Corporation, Japan, the EMI shield effect of the resultant plate was measure at a frequency of 100 to 1,000 MHz in an electromagnetic black box. The results shown in Table are the attenuation values at 500 MHz.

(i) Coefficient of Dynamic Friction and Abrasion Wear

The plate used for gloss measurement was set on the specimen carrier of a reciprocating abrasion tester AFT-15MS manufactured by ORIENTEC Co., Ltd., Japan. An SUS304-made precision ball with a diameter of 5 mm was pressed onto the plate at a load of 3 kg and reciprocated thereon within 20 mm at 30 mm/sec. A friction at the $100^{th}$ reciprocation was measured and converted into a coefficient of dynamic friction. The abrasion wear was measured by carrying out reciprocation 1,000 times under the same conditions as for the friction measurement and observing a frictional trace on the surface of the plate using an instrument for surface roughness Surfcom 575A-3D manufactured by ORIENTEC Co., Ltd., Japan.

EXAMPLE 1

The roving of a carbon fiber (CF-R) with a diameter of 7 μm was immersed in an AS emulsion, wrung out so that the solid emulsion content attached thereto was 20% by weight in a dried state, and dried. Then, using an extruder, the carbon fiber roving was further coated with the ABS-1 resin so that the carbon fiber content in the pellet was 15% by weight. Using a cutter, the resultant strand was cut into pellets with a length of 5.5 mm with a carbon fiber content of 15% by weight. At the time when the strand was cut, the carbon fibers did not become exposed or slip out of the pellets.

Using Injection Molding Machine-1, the above-obtained pellets were injection molded to obtain a molded article wherein the settings for the cylinder temperature was 220° C., back pressure was 20 kg/cm²G, screw rotating rate was 100 rpm, injection speed was adjusted to 80% of the maximum injection speed prescribed in the specifications of the molding machine, and the gate was shaped into a 1 mm ⌀ pin gate. The resultant article had excellent dispersibility of the carbon fibers. The contents of (a) the carbon fiber having a length of more than 1.5 mm, (b) the carbon fiber having a length of 0.5 to 1.5 mm and (c) the carbon fiber having a length of less than 0.5 mm were 3.3% by weight, 5.0% by weight and 6.7% by weight, respectively based on the total amount of carbon fibers and resin. The weight ratio of (a), (b) and (c) was 1/1.5/2.0.

The resultant molded article had a good appearance, a surface gloss of 75%, a bending strength of 17 kg/mm², a flexural modulus of 1,100 kg/mm², and a volume resistivity of 0.5 Ω·cm. The results are shown in Table 1.

Comparative Example 1

The carbon fiber containing pellets obtained in Example 1 were injection molded under conditions wherein the cylinder temperature was 270° C. and the back pressure, screw rotating rate, injection speed were set at the minimum prescribed in the specifications of the molding machine in order to make the shear stress as small as possible. The resultant molded article contained 8.2% by weight of the carbon fibers having a length of more than 1.5 mm. The appearance thereof was considerably poor (x) due to exposure of the carbon fibers and rough surface caused by the agglomeration of the carbon fibers such that the article was not marketable. The volume resistivity of the article was 5 $\Omega \cdot cm$.

Examples 2 to 6 and Comparative Examples 2 to 4

In Examples 2, 4 and 5 and Comparative Example 2, molded articles were prepared according to the same process as in Example 1 except that the carbon fiber contents in the pellets were changed. In Examples 3 and 6 and Comparative Example 3, molded articles were prepared according to the same process as in Example 1 except that the ABS-1 resin was employed and the carbon fiber contents in the pellets were changed. In Comparative Example 4, a molded article was prepared according to the same process as in Example 1 except that pellets were produced by mixing the chopped fibers (C-CF) and thermoplastic resin ABS-1 with a tumbler and extruding the mixture with a twin-screw extruder. The results are shown in Table 1.

EXAMPLE 7

The ABS-1 pellets with the carbon fiber content of 15% by weight obtained in Example 1 were mixed with ABS-1 pellets without containing carbon fibers at a ratio of 1/2. Using the resultant mixture, a molded article was prepared. The resultant article was excellent in the dispersibility of the carbon fibers. The contents of (a) the carbon fiber having a length of more than 1.5 mm, (b) the carbon fiber having a length of 0.5 to 1.5 mm and (c) the carbon fiber having a length of less than 0.5 mm were 1.2% by weight, 1.7% by weight and 2.1% by weight, respectively. The weight ratio of (a), (b) and (c) was 1/1.4/1.8.

The resultant molded article had a good appearance, a surface gloss of 90%, a bending strength of 11 kg/mm$^2$, a flexural modulus of 1,100 kg/mm$^2$, and a volume resistivity of 9×10$^2$ $\Omega \cdot cm$.

EXAMPLES 8 to 23

Molded articles were prepared according to the same process as in Example 1 except that thermoplastic resins and coupling agents listed in Tables 2 and 3 were employed for the production of carbon fiber containing pellets and the cylinder temperatures at molding were suitably changed according to the thermoplastic resin employed. The results are shown in Tables 2 and 3.

Comparative Example 5

A molded article was prepared according to the same process as in Example 1 except that pellets were produced by mixing 25% by weight of 6 mm long chopped fiber (C-CF) coated with an epoxy type sizing agent and 75% by weight of pellets of high density PE (HDPE) with a density of 0.95 and MFR of 3.0 g/10 min. The high density PE was prepared by mixing PE-1 (density: 0.95; MFR: 7 g/10 min.) with PE-2 (density: 0.95; MFR: 1.3 g/10 min.) followed by extrusion. The resultant molded article was composed of (a) the carbon fiber having a length of more than 1.5 mm, (b) the carbon fiber having a length of 0.5 to 1.5 mm and (c) the carbon fiber having a length of less than 0.5 mm of 3.0% by weight, 12.8% by weight and 9.2% by weight, respectively based on the total amount of carbon fibers and resin. The weight ratio of (a), (b) and (c) was 1/4.3/3.1. The appearance thereof was poor due to exposure of the carbon fibers and the surface was rough due to the agglomeration of the carbon fibers. The volume resistivity of the article was 10 $\Omega \cdot cm$. The molded article of Example 12, of which carbon fiber content was 15% by weight, had a volume resistivity of 0.3 $\Omega \cdot cm$. On the contrary, the article obtained herein was inferior to Example 12 in volume resistivity despite of a higher carbon fiber content, 25% by weight. It is theorized that such a poor appearance and electric properties were due to the length and dispersibility of the carbon fibers.

Comparative Example 6

A molded article was prepared according to the same process as in Example 1 except that pellets were produced by mixing 0.5% by weight of 5.5 mm long chopped fiber (C-CF) coated with an epoxy type sizing agent and 99.5% by weight of ABS-1 pellets followed by extrusion with a twin-screw extruder. The resultant molded article was composed of (a) the carbon fiber having a length of more than 1.5 mm, (b) the carbon fiber having a length of 0.5 to 1.5 mm and (c) the carbon fiber having a length of less than 0.5 mm of 0% by weight, 0.3% by weight and 99.7% by weight, respectively based on the total amount of carbon fibers and resin. The resultant molded article had a good dispersibility of the carbon fibers, a good appearance, and a surface gloss of 97%. However, the volume resistivity was 10$^{14}$ $\Omega \cdot cm$ or more, which was almost equal to that of the ABS resin without carbon fibers.

EXAMPLE 24

The carbon fiber roving (CF-R) was immersed in AS emulsion, wrung out so that the solid emulsion content attached thereto was 20% by weight in a dried state, and dried. Subsequently, the strand of the roving was cut into pellets with a length of 5.5 mm. 15% by weight of the cut carbon fiber coated with AS emulsion was mixed with 85% by weight of ABS-1 pellets without containing carbon fibers. The resultant mixture was molded into an article according to the same process as in Example 1. The resultant article was excellent in the dispersibility of the carbon fibers. The contents of (a) the carbon fiber having a length of more than 1.5 mm, (b) the carbon fiber having a length of 0.5 to 1.5 mm and (c) the carbon fiber having a length of less than 0.5 mm were 3.0% by weight, 4.9% by weight and 7.1% by weight, respectively based on the total amount of carbon fibers and resin. The weight ratio of (a), (b) and (c) was 1/1.6/2.4.

The resultant molded article had a good appearance, a surface gloss of 75%, a bending strength of 16 kg/mm$^2$, a flexural modulus of 1,050 kg/mm$^2$, and a volume resistivity of 0.3 $\Omega \cdot cm$.

EXAMPLE 25

The carbon fiber roving (CF-R) plated with a nickel metal was immersed in AS emulsion, wrung out so that the solid emulsion content attached thereto be 20% by weight in a dried state, and dried. Then, using a single-screw extruder, the carbon fiber roving was coated with the melted ABS-1 resin so that the carbon fiber content in a pellet be 15% by weight. Using a cutter, the resultant strand was cut into pellets with a length of 5.5 mm and a carbon fiber content of 15% by weight.

Using the resultant pellets, a molded article was prepared according to the same process as in Example 1. The resultant article had excellent carbon fiber dispersion. The contents of (a) the carbon fiber having a length of more than 1.5 mm, (b) the carbon fiber having a length of 0.5 to 1.5 mm and (c) the carbon fiber having a length of less than 0.5 mm were 3.5% by weight, 5.2% by weight and 6.3% by weight, respectively based on the total amount of carbon fibers and resin. The weight ratio of (a), (b) and (c) was 1/1.5/1.8.

The resultant molded article had a good appearance, a surface gloss of 76%, a bending strength of 16 kg/mm$^2$, a flexural modulus of 1,050 kg/mm$^2$, and a volume resistivity of 0.08 Ω19 cm.

EXAMPLE 26

The carbon fiber roving (CF-R) was coated with melted PP resin according to the pultrusion process. In other words, the PP resin was applied to the roving using an extruder while the roving was aligned by tension. After the disentangling step for fully coating each carbon fiber with the PP resin, the coated roving was cut into pellets. The amount of the PP resin attached to (coating) the roving was adjusted to 30% by weight. 50% by weight of the carbon fiber coated with the PP resin was mixed with 50% by weight of PP resin pellets without containing carbon fibers. Using the resultant mixture, a molded article was prepared according to the same process as in Example 1. The resultant article had excellent dispersion of the carbon fibers. The contents of (a) the carbon fiber having a length of more than 1.5 mm, (b) the carbon fiber having a length of 0.5 to 1.5 mm and (c) the carbon fiber having a length of less than 0.5 mm were 3.3% by weight, 5.0% by weight and 6.8% by weight, respectively based on the total amount of carbon fibers and resin. The weight ratio of (a), (b) and (c) was 1/1.5/2.1.

The resultant molded article had a good appearance, a surface gloss of 75%, and a volume resistivity of 0.3 Ω·cm.

EXAMPLE 27

With regard to some of the molded articles obtained in the Examples and Comparative Examples, the EMI shield was measured. The results are shown in Table 4. In general, the EMI shield is preferably 20 dB or more to achieve a sufficient effect. In order for an article to exhibit sufficient EMI shield, the volume resistivity thereof should be $10^{-4}$ to $10^3$ Ω·cm.

EXAMPLE 28

Some of the molded articles obtained in the Examples and Comparative Examples were evaluated in the suitability for a sliding element. The results are shown in Table 5. When the article was used as a sliding element, the abrasion wear was preferably 32 μm or less. For imparting antistatic properties to the article, the volume resistivity was $10^9$ Ω·cm or less, preferably $10^0$ to $10^9$ Ω·cm. The article with such volume resistivity attracted only a few dust particles even when left in a room.

EXAMPLE 29

Some of the molded articles obtained in the Examples and Comparative Examples were evaluated for suitability as an IC tray. The results are shown in Table 6. Since the suitability as an IC tray is generally judged based on a surface resistivity, the surface resistivity of each article was measured together with the volume resistivity. The article having a surface resistivity of $10^2$ to $10^{10}$Ω attracted few dust particles even when left in a room.

TABLE 1

| | Example | | | | | | Comparative Example | | |
|---|---|---|---|---|---|---|---|---|---|
| | 1 | 2 | 3 | 4 | 5 | 6 | 2 | 3 | 4 |
| Thermoplastic resin | ABS-1 | ABS-1 | ABS-2 | ABS-1 | ABS-1 | ABS-2 | ABS-1 | ABS-2 | ABS-1 |
| Carbon fiber (wt. %) | CF-R (15) | CF-R (5) | CF-R (5) | CF-R (1.5) | CF-R (0.5) | CF-R (0.5) | CF-R (30) | CF-R (0.3) | C-CF (20) |
| Sizing Agent (wt. %) | AS (20) | AS (20) | AS (20) | AS (20) | AS (20) | AS (20) | AS (20) | AS (20) | none |
| Pellet length (mm) | | | | 5.5 | | | | 5.5 | 2.7 |
| Carbon fiber length in the article (ratio) | | | | | | | | | |
| >1.5 mm (wt. %) | 3.3 (1.0) | 1.1 (1.0) | 1.3 (1.0) | 0.3 (1.0) | 0.1 (1.0) | 0.1 (1.0) | 6.6 (1.0) | 0.1 (1.0) | 0 |
| 0.5–1.5 mm (wt. %) | 5.0 (1.5) | 1.6 (1.5) | 1.7 (1.3) | 0.5 (1.7) | 0.2 (2.0) | 0.2 (2.0) | 9.9 (1.5) | 0.1 (1.0) | 0 |
| <0.5 mm (wt. %) | 6.7 (2.0) | 2.3 (2.1) | 2.0 (1.5) | 0.7 (2.3) | 0.2 (2.0) | 0.2 (2.0) | 13.5 (2.0) | 0.1 (1.0) | 20.0 |
| Dispersibility of CF | ○ | ○ | ○ | ○ | ○ | ○ | Δ | ○ | ○ |
| Appearance | ○ | ○ | ○ | ○ | ○ | ○ | Δ | ○ | ○ |
| Surface gloss (%) | 75 | 91 | 85 | 93 | 98 | 98 | 70 | 100 | 65 |
| Bending strength (kg/mm$^2$) | 17 | 11 | 11 | 10 | 10 | 10 | 17 or more | 9 | 10 |
| Flexural modulus (kg/mm$^2$) | 1100 | 650 | 650 | 540 | 410 | 410 | 1200 or more | 370 | 680 |
| Volume resistivity (Ω · cm) | 0.5 | $1 \times 10^1$ | $1 \times 10^1$ | $3 \times 10^5$ | $1 \times 10^9$ | $1 \times 10^9$ | 0.08 | $1 \times 10^{12}$ | 560 |

TABLE 2

| | Example | | | | | | | |
|---|---|---|---|---|---|---|---|---|
| | 8 | 9 | 10 | 11 | 12 | 13 | 14 | 15 |
| Thermoplastic resin | HIPS | PMMA | AS | PPE-1 | PE-1 | PP | POM | PA |
| Carbon fiber (wt. %) | | | | | CF-R (15) | | | |
| Sizing Agent (wt. %) | SB (20) | AS (20) | AS (20) | SB (20) | EVA (20) | EVA (20) | EVA (20) | Urethane (20) |
| Pellet length (mm) | | | | | 5.5 | | | |
| Carbon fiber length in the article (ratio) | | | | | | | | |
| >1.5 mm (wt. %) | 3.2 (1.0) | 3.3 (1.0) | 3.3 (1.0) | 3.0 (1.0) | 3.2 (1.0) | 3.1 (1.0) | 3.3 (1.0) | 3.2 (1.0) |
| 0.5–1.5 mm (wt. %) | 5.0 (1.6) | 4.9 (1.5) | 5.0 (1.5) | 4.9 (1.6) | 4.9 (1.5) | 4.8 (1.5) | 4.9 (1.5) | 5.1 (1.6) |
| <0.5 mm (wt. %) | 6.8 (2.1) | 6.8 (2.1) | 6.7 (2.0) | 7.1 (2.4) | 6.9 (2.2) | 7.1 (2.3) | 6.8 (2.1) | 6.7 (2.1) |
| Dispersibility of CF | ○ | ○ | ○ | ○ | ○ | ○ | ○ | ○ |
| Appearance | ○ | ○ | ○ | ○ | ○ | ○ | ○ | ○ |
| Surface gloss (%) | 66 | 85 | 82 | 66 | 72 | 75 | 80 | 75 |
| Volume resistivity (Ω · cm) | 0.4 | 0.9 | 0.5 | 0.6 | 0.3 | 0.3 | 0.5 | 0.1 |

TABLE 3

| | Example | | | | | | | |
|---|---|---|---|---|---|---|---|---|
| | 16 | 17 | 18 | 19 | 20 | 21 | 22 | 23 |
| Thermoplastic resin | HIPS | PMMA | AS | PPE-2 | PE-1 | PP | POM | PA |
| Carbon fiber (wt. %) | | | | | CF-R (5) | | | |
| Sizing Agent (wt. %) | SB (20) | AS (20) | AS (20) | SB (20) | EVA (20) | EVA (20) | EVA (20) | Urethane (20) |
| Pellet length (mm) | | | | | 5.5 | | | |
| Carbon fiber length in the article (ratio) | | | | | | | | |
| >1.5 mm (wt. %) | 1.1 (1.0) | 1.2 (1.0) | 1.2 (1.0) | 1.0 (1.0) | 1.1 (1.0) | 1.0 (1.0) | 1.2 (1.0) | 1.1 (1.0) |
| 0.5–1.5 mm (wt. %) | 1.6 (1.5) | 1.5 (1.3) | 1.6 (1.3) | 1.5 (1.5) | 1.6 (1.5) | 1.5 (1.5) | 1.5 (1.3) | 1.6 (1.5) |
| <0.5 mm (wt. %) | 2.3 (2.1) | 2.3 (1.9) | 2.2 (1.8) | 2.5 (2.5) | 2.3 (2.1) | 2.5 (2.5) | 2.3 (1.9) | 2.3 (2.1) |
| Dispersibility of CF | ○ | ○ | ○ | ○ | ○ | ○ | ○ | ○ |
| Appearance | ○ | ○ | ○ | ○ | ○ | ○ | ○ | ○ |
| Surface gloss (%) | 75 | 90 | 87 | 76 | 85 | 87 | 90 | 91 |
| Volume resistivity (Ω · cm) | 5 | 19 | 10 | 20 | 13 | 13 | 25 | 20 |

TABLE 4

| | Volume resistivity (Ω · cm) | EMI shield (dB) |
|---|---|---|
| Example 1 | 0.5 | 54 |
| Example 2 | $1 \times 10^1$ | 36 |
| Example 8 | 0.4 | 52 |
| Example 9 | 0.9 | 49 |
| Example 10 | 0.5 | 56 |
| Example 11 | 0.6 | 55 |
| Example 12 | 0.3 | 60 |
| Example 13 | 0.3 | 61 |
| Example 14 | 0.5 | 58 |
| Example 15 | 0.1 | 66 |
| Example 24 | 0.3 | 60 |
| Example 25 | 0.08 | 65 |

TABLE 5

| | Volume resistivity (Ω · cm) | Coefficient of dynamic friction | Abrasion wear (μm) |
|---|---|---|---|
| Example 3 | 10 | 0.22 | 21 |
| Example 6 | $1 \times 10^9$ | 0.35 | 31 |
| Example 16 | 5 | 0.27 | 25 |
| Example 17 | 19 | 0.20 | 15 |
| Example 18 | 10 | 0.21 | 20 |
| Example 19 | 20 | 0.31 | 23 |
| Example 20 | 13 | 0.17 | 17 |
| Example 21 | 13 | 0.16 | 16 |
| Example 22 | 25 | 0.11 | 9 |
| Example 23 | 20 | 0.19 | 21 |
| Comparative Example 3 | $1 \times 10^{12}$ | 0.50 | 57 |

TABLE 6

| | Volume resistivity (Ω · cm) | Surface resistivity (Ω) |
|---|---|---|
| Example 2 | $1 \times 10^1$ | 20 |
| Example 4 | $3 \times 10^5$ | $4 \times 10^6$ |
| Example 5 | $1 \times 10^9$ | $1 \times 10^{10}$ |

What is claimed is:

1. A molded article comprising:
a thermoplastic resin/carbon fiber mixture comprising:
   (1) 70 to 99.5% by weight of a thermoplastic resin, and
   (2) 0.5 to 30% by weight of carbon fibers;
   wherein the carbon fiber comprises,
      (a) carbon fibers having a length of more than 1.5 mm being contained in an amount of 0.1 to 4.7% by weight,
      (b) carbon fibers having a length of 0.5 to 1.5 mm being contained in an amount of 0.2 to 10.7% by weight, and
      (c) carbon fibers having a length of less than 0.5 mm being contained in an amount of 0.2 to 14.6% by weight, wherein the weight % is based on the total amount of the thermoplastic resin and the carbon fibers.

2. The molded article according to claim 1, wherein a weight ratio of the carbon fibers (a), (b) and (c) is (a)/(b)/(c)=1/0.5 to 2.5/0.5 to 3.0.

3. The molded article according to claim 1, wherein the carbon fibers are coated with a resin compatible with the thermoplastic resin.

4. The molded article according to claim 1, which is prepared according to a method comprising the steps of:
   (1) extrusion coating a roving of the carbon fiber with the thermoplastic resin using an extruder,
   (2) cutting the roving coated with the thermoplastic resin into pellets, and
   (3) molding the above-obtained pellets into a molded article.

5. The molded article according to claim 4, wherein the roving of the carbon fiber is coated with a resin compatible with the thermoplastic resin.

6. The molded article according to claim 5, wherein the resin compatible with a thermoplastic resin, which is applied to the carbon fiber, is an emulsion resin.

7. The molded article according to claim 5, wherein the carbon fiber is coated in accordance with a melt extrusion coating method.

8. The molded article according to claim 1, which is prepared according to a method comprising the steps of:
   (1) extrusion coating a roving of the carbon fiber with the thermoplastic resin using an extruder,
   (2) cutting the roving coated with the thermoplastic resin into pellets,
   (3) mixing the above-obtained pellets with pellets of the thermoplastic resin, and
   (4) molding the above-obtained mixture into a molded article.

9. The molded article according to claim 1, which is prepared according to a method comprising the steps of:
   (1) cutting a roving of the carbon fiber into pellets,
   (2) mixing the above-obtained pellets with pellets of the thermoplastic resin, and
   (3) molding the above-obtained mixture into a molded article.

10. The molded article according to claim 1, wherein a conductive layer is formed on the surface of the carbon fiber.

11. The molded article according to claim 10, wherein the conductive layer is formed by plating or immersing.

12. A method of reducing electromagnetic radiation comprising: placing the molded article according to claim 1 in the path of the electromagnetic radiation, wherein the molded article has a volume resistivity of $10^{-4}$ to $10^3$ Ω·cm.

13. A method of preparing the molded article according to claim 1 comprising molding the thermoplastic resin/carbon fiber mixture in the form of a resistor having a volume resistivity of $10^2$ to $10^{13}$ Ω·cm.

14. A method of preparing the molded article according to claim 1 comprising molding the thermoplastic resin/carbon fiber mixture in the form of a conductive sliding element having a volume resistivity of $10^0$ to $10^9$ Ω·cm.

15. A method of preparing the molded article according to claim 1 comprising molding the thermoplastic resin/carbon fiber mixture in the form of an integrated circuit tray having a surface resistivity of $10^2$ to $10^{10}$Ω.

* * * * *